(12) United States Patent
Bae

(10) Patent No.: US 11,578,392 B2
(45) Date of Patent: Feb. 14, 2023

(54) HIGH-STRENGTH HIGH-TOUGHNESS HOT-ROLLED STEEL SHEET AND MANUFACTURING METHOD THEREFOR

(71) Applicant: POSCO, Pohang-si (KR)

(72) Inventor: Jin-Ho Bae, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 16/957,939

(22) PCT Filed: Sep. 17, 2018

(86) PCT No.: PCT/KR2018/010935
§ 371 (c)(1),
(2) Date: Jun. 25, 2020

(87) PCT Pub. No.: WO2019/132179
PCT Pub. Date: Jul. 4, 2019

(65) Prior Publication Data
US 2021/0062312 A1    Mar. 4, 2021

(30) Foreign Application Priority Data
Dec. 26, 2017 (KR) .................. 10-2017-0179337

(51) Int. Cl.
| | | |
|---|---|---|
| *C22C 38/50* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/48* | (2006.01) | |
| *C21D 8/02* | (2006.01) | |

(52) U.S. Cl.
CPC ............ *C22C 38/50* (2013.01); *C21D 8/0226* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/48* (2013.01); *C21D 2211/005* (2013.01)

(58) Field of Classification Search
CPC ....... C22C 38/50; C22C 38/46; C22C 38/002; C22C 38/02; C22C 38/04; C22C 38/06; C22C 38/42; C22C 38/48; C21D 2211/005
USPC ........................................................ 428/544
See application file for complete search history.

(56) References Cited

U.S. PATENT DOCUMENTS

| | | |
|---|---|---|
| 6,290,784 B1 | 9/2001 | Yasuhara et al. |
| 2003/0041932 A1 | 3/2003 | Tosaka et al. |
| 2011/0023991 A1 | 2/2011 | Fujishiro et al. |
| 2014/0227666 A1 | 8/2014 | Milanov et al. |
| 2014/0290807 A1 | 10/2014 | Goto et al. |
| 2015/0004050 A1 | 1/2015 | Matsuki et al. |
| 2018/0044753 A1 | 2/2018 | Honda et al. |

FOREIGN PATENT DOCUMENTS

| | | |
|---|---|---|
| CN | 101135029 A | 3/2008 |
| CN | 101965414 A | 2/2011 |
| CN | 103687975 A | 3/2014 |
| CN | 105463324 A | 4/2016 |
| CN | 107406947 A | 11/2017 |
| EP | 2752499 A1 | 7/2014 |
| EP | 3246427 A1 | 11/2017 |
| EP | 3255168 A1 | 12/2017 |
| JP | 2000-144316 A | 5/2000 |
| JP | 2002-003985 A | 1/2002 |
| JP | 2002-47536 A | 2/2002 |
| JP | 2004-351501 A | 12/2004 |
| JP | 2005-290546 A | 10/2005 |
| JP | 2010-106287 A | 5/2015 |
| KR | 10-2003-0054952 A | 7/2003 |
| KR | 10-0833035 B1 | 5/2008 |
| KR | 10-2006-0071100 A | 3/2012 |
| KR | 10-2015-0075292 B1 | 7/2015 |
| KR | 10-1585724 B1 | 1/2016 |
| KR | 10-2016-0077385 A | 7/2016 |
| KR | 10-2016-0078714 A | 7/2016 |
| WO | 2013/108861 A1 | 7/2013 |
| WO | 2013/049901 A1 | 11/2013 |

OTHER PUBLICATIONS

Bai et al., CN105463324 B Machine Translation, Apr. 6, 2016, entire translation (Year: 2016).*
International Search Report and Written Opinion issued in International Application PCT/KR2018/010935 dated Dec. 4, 2018.
Extended European Search Report dated Sep. 14, 2020 issued in European Patent Application No. 18895072.9.
Chinese Office Action dated Jul. 2, 2021 issued in Chinese Patent Application No. 201880084502.3.
Japanese Office Action dated Sep. 28, 2021 issued in Japanese Patent Application No. 2020-535191.

* cited by examiner

*Primary Examiner* — Humera N. Sheikh
*Assistant Examiner* — Katherine A Christy
(74) *Attorney, Agent, or Firm* — Morgan, Lewis & Bockius LLP

(57) ABSTRACT

A preferable aspect of the present invention provides a high-strength high-toughness hot-rolled steel sheet and a manufacturing method therefor, wherein the hot-rolled steel sheet contains, by weight, 0.07-0.13% C, 0.20-0.50% Si, 0.5-0.9% Mn, 0.03% or less P, 0.02% or less S, 0.005-0.03% Nb, 0.3-0.6% Cr, 0.005-0.03% Ti, 0.1-0.35% Cu, 0.05-0.3% Ni, 0.01-0.15% Mo, 0.007% or less N, 0.001-0.006% Ca, 0.01-0.05% Al, and the balance Fe and other unavoidable impurities, the alloy elements satisfying the following relational formulas [Relational formula 1] $1.6 \leq (Mo/96)/(P/31) \leq 6$, [Relational formula 2] $1.6 \leq (Ca/S) \leq 3$, and [Relational formula 3] $3.5 \leq (3*C/12+Mn/55)*100 \leq 5$; wherein a microstructure comprises, by area fraction, 85% or more of polygonal ferrite and 15% or less of pearlite, the crystal grain size of the polygonal ferrite being 10 μm or less; and wherein a variation in yield strength in a width direction is 35 MPa or lower.

1 Claim, No Drawings

HIGH-STRENGTH HIGH-TOUGHNESS HOT-ROLLED STEEL SHEET AND MANUFACTURING METHOD THEREFOR

CROSS-REFERENCE OF RELATED APPLICATIONS

This application is the U.S. National Phase under 35 U.S.C. § 371 of International Application No. PCT/KR2018/010935 filed on Sep. 17, 2018 which claims the benefit of Korean Patent Application No. 10-2017-0179337 filed Dec. 26, 2017. The entire disclosures of each are incorporated by reference herein.

TECHNICAL FIELD

The present disclosure relates to a high-strength high-toughness hot-rolled steel sheet used in construction, pipelines, and oil well pipes and a method for manufacturing the same, and more particularly, to a high-strength high-toughness hot-rolled steel sheet having a small variations in yield strength in a width direction and a method for manufacturing the same.

BACKGROUND ART

When oil and gas are mined, a steel pipe for an oil well is applied to a maximum of 5 km from an upper portion to a lower portion of the oil field. As a mining depth of an oil well has been increased, steel pipes used for oil wells are required to have high strength, high internal and external pressure resistance crush strength, high toughness, and excellent delayed fracture resistance.

In addition, as a mining environment becomes harsh, the mining costs have been rapidly increased. Therefore, various efforts have been made to reduce costs.

In particular, since steel pipes for oil wells, used for maintenance of the oil wells, are subjected to repeated bending during use thereof, materials of the steel pipes are required to have uniformity. When strength of a steel pipe is not uniform in a circumferential direction or in a length direction, buckling or fracturing may occur first in a low-strength portion during repeated bending.

Such a steel material, used to produce steel pipes for maintenance of oil wells, has a thickness of about 2 mm to about 5 mm. During hot rolling, a thickness deviation occurs in both edges portions due to excessive bending of rolling rolls. During water cooling, both edge portions are excessively cooled, as compared with a center portion, to easily cause a deviation of material properties in a width direction. When mining is performed in polar regions, such a steel material is additionally required to have excellent low-temperature toughness at temperature of −40° C. or lower.

Accordingly, there is a need for a hot-rolled steel sheet having excellent low-temperature toughness while having a small deviation in strength in a width direction of a hot-rolled coil and a method for manufacturing the same.
(Patent Document 1) Korean Patent Publication No. 2016-0077385

DISCLOSURE

Technical Problem

An aspect of the present disclosure is to provide a high-strength hot-rolled steel sheet having excellent low-temperature toughness while having a small deviation in strength in a width direction of the steel sheet.

Another aspect of the present disclosure is to provide a method for manufacturing a high-strength hot-rolled steel sheet having excellent low-temperature toughness while having a small deviation in strength in a width direction of the steel sheet by optimizing a composition and a hot-rolling process.

Technical Solution

According to an aspect of the present disclosure, a high-strength high-toughness hot-rolled steel sheet includes, by weight percentage (wt %): 0.07 to 0.13% of carbon (C), 0.20 to 0.50% of silicon (Si), 0.5 to 0.9% of manganese (Mn), 0.03% or less of phosphorus (P), 0.02% or less of sulfur (S), 0.005 to 0.03% of niobium (Nb), 0.3 to 0.6% of chromium (Cr), 0.005 to 0.03% of titanium (Ti), 0.1 to 0.35% of copper (Cu), 0.05 to 0.3% of nickel (Ni), 0.01 to 0.15% of molybdenum (Mo), 0.007% or less of nitrogen (N), 0.001 to 0.006% of calcium (Ca), 0.01 to 0.05% of aluminum (Al), and a balance of iron (Fe) and other unavoidable impurities, the alloy elements satisfying Relational Expressions 1 to 3, Relational Expression 1: $1.6 \leq (Mo/96)/(P/31) \leq 6$, Relational Expression 2: $1.6 \leq (Ca/S) \leq 3$, and Relational Expression 3: $3.5 \leq (3*C/12 + Mn/55)*100 \leq 5$, wherein a microstructure comprises, by area fraction, 85% or more of polygonal ferrite and 15% or less of pearlite and a grain size of the polygonal ferrite is 10 μm or less, and wherein a deviation in yield strength in a width direction is 35 MPa or less.

In the hot-rolled steel sheet, the number of precipitates of 20 nm or less per $mm^2$ may be $7 \times 10^8$ or more.

In the hot-rolled steel sheet, an impact toughness value measured through a Charpy impact test at temperature of −60° C. may be 95 J or more, separation on the fracture surface of the impact specimen may be 0.01/mm or less, and a yield strength at room temperature may be 520 MPa or more and a tensile strength at room temperature may be 640 MPa or more.

According to another aspect of the present disclosure, a method for manufacturing a high-strength high-toughness hot-rolled steel sheet includes: preparing a steel slab comprising, by weight percentage (wt %), 0.07 to 0.13% of carbon (C), 0.20 to 0.50% of silicon (Si), 0.5 to 0.9% of manganese (Mn), 0.03% or less of phosphorus (P), 0.02% or less of sulfur (S), 0.005 to 0.03% of niobium (Nb), 0.3 to 0.6% of chromium (Cr), 0.005 to 0.03% of titanium (Ti), 0.1 to 0.35% of copper (Cu), 0.05 to 0.3% of nickel (Ni), 0.01 to 0.15% of molybdenum (Mo), 0.007% or less of nitrogen (N), 0.001 to 0.006% of calcium (Ca), 0.01 to 0.05% of aluminum (Al), and a balance of iron (Fe) and other unavoidable impurities, the alloy elements satisfying Relational Expressions 1 to 3; heating the steel slab to a temperature within a range of 1100 to 1300° C. and maintaining the heated steel slab at temperature of 1160° C. or higher for 30 minutes or more, and then extracting; primarily hot rolling the heated and extracted steel slab under conditions of a finish rolling temperature of 900 to 1000° C. and a reduction ratio of 10% or more per pass in a recrystallization region and secondarily hot rolling under conditions of a finish rolling temperature of 750 to 870° C. and a cumulative reduction ratio of 85% or more in a non-recrystallization region to obtain a hot-rolled steel sheet; and water cooling the hot-rolled steel sheet to a cooling end temperature within a range of 500 to 580° C. at a cooling rate of 10 to 50° C. and then,

| | |
|---|---|
| 1.6≤(Mo/96)/(P/31)≤6, | Relational Expression 1: |
| 1.6≤(Ca/S)≤3, and | Relational Expression 2: |
| 3.5≤(3*C/12+Mn/55)*100≤5 | Relational Expression 3: | wherein heat energy is applied to both edge portions of the steel sheet to reduce a difference in cooling rates between a center portion and an edge portion of a steel material.

The hot rolling may be performed such that a deviation in thickness at an edge portion of the steel sheet and at a point of 100 mm from the edge portion is 90 mm or less.

The applying heat energy to both edge portions of the steel sheet may be performed such that a deviation in temperature in a width direction of the steel sheet during water cooling is 150° C. or less.

The applying heat energy to both edge portions of the steel sheet may be performed using an edge heater and an edge mask.

A deviation in yield strength in a width direction of the hot-rolled steel sheet may be 35 MPa or lower, an impact toughness value measured through a Charpy impact test at temperature of −60° C. may be 95 J or more, separation on a fracture surface of an impact specimen may be 0.01/mm or less, and a yield strength at room temperature may be 520 MPa or more and a tensile strength at room temperature may be 640 MPa or more.

Advantageous Effects

According to an aspect of the present disclosure, a high-strength hot-rolled steel sheet having excellent low-temperature toughness and a small deviation in strength in a width direction of the steel sheet may be provided.

BEST MODE FOR INVENTION

The present disclosure provides a high-strength high-toughness hot-rolled steel sheet having excellent low-temperature toughness while having a small deviation in strength in a width direction of the steel sheet by optimizing a composition, composition ranges, composition relational expressions, and manufacturing conditions and a method for manufacturing the same.

Hereinafter, a high-strength and high-toughness hot-rolled steel sheet according to an aspect of the present disclosure will be described in detail.

A high-strength high-toughness hot-rolled steel sheet according to an aspect of the present disclosure includes, by weight percentage (wt %): 0.07 to 0.13% of carbon (C), 0.20 to 0.50° of silicon (Si), 0.5 to 0.9% of manganese (Mn), 0.03% or less of phosphorus (P), 0.02% or less of sulfur (S), 0.005 to 0.03% of niobium (Nb), 0.3 to 0.6% of chromium (Cr), 0.005 to 0.03% of titanium (Ti), 0.1 to 0.35% of copper (Cu), 0.05 to 0.3% of nickel (Ni), 0.01 to 0.15% of molybdenum (Mo), 0.007% or less of nitrogen (N), 0.001 to 0.006% of calcium (Ca), 0.01 to 0.05% of aluminum (Al), and a balance of iron (Fe) and other unavoidable impurities, the alloy elements satisfying Relational Expressions 1 to 3,

| | |
|---|---|
| 1.6≤(Mo/96)/(P/31)≤6, | Relational Expression 1: |
| 1.6≤(Ca/S)≤3, and | Relational Expression 2: |
| 3.5≤(3*C/12+Mn/55)*100≤5 | Relational Expression 3: |

C: 0.07 to 0.13 wt % (Hereinafter, also Referred to "%")

Carbon (C) is an element increasing hardenability of a steel material. When the content of C is less than 0.07%, the hardenability is insufficient, and thus, desired strength of the present disclosure may not be secured. On the other hand, when the content of C is greater than 0.13%, yield strength is too high, which may cause difficulty in working or deteriorated low-temperature toughness. Therefore, the above contents are not preferable. Therefore, in the present disclosure, the content of C may be controlled to be 0.07 to 0.13%.

Si: 0.20 to 0.50%

Silicon (Si) increases activity of C in a ferrite phase, promotes ferrite stabilization, and is effective in securing strength as a result of solid-solution strengthening. In addition, Si forms an oxide having a low melting point such as $Mn_2SiO_4$, or the like, during ERW welding and allows the oxide to be easily discharged during welding. When the content of Si is less than 0.2%, a cost problem in steelmaking may occur. Meanwhile, when the content of Si is greater than 0.5%, the amount of formation of a $SiO_2$ oxide having a high melting point, other than $Mn_2SiO_4$, may be increased and toughness of a welding zone may be reduced during electric resistance welding. Therefore, the content of Si may be limited to a range of, in detail, 0.20 to 0.50%.

Mn: 0.5 to 0.9%

Manganese (Mn) is an element having a significant effect on an austenite/ferrite transformation initiation temperature and lowering a transformation initiation temperature. In addition, Mn has an effect on toughness of a pipe base portion and a welding zone, and contributes to an increase in strength as a solid-solution strengthening element. When the content of Mn is less than 0.5%, it may be difficult to obtain the above effect. Meanwhile, when the content of Mn is greater than 0.9%, there is a high possibility that a segregation zone is formed. Therefore, the content of Mn may be limited to a range of 0.5 to 0.9%.

P: 0.03% or Less (Including 0%)

Phosphorus (P) is an element unavoidably included when manufacturing steel. When P is added, P may be segregated in a central portion of the steel sheet and may be used as a cracking initiation point or a cracking propagation path. It is theoretically advantageous to limit the content of P to 0%, but P is unavoidably added as an impurity in a manufacturing process. Therefore, it is important to manage an upper limit and, in the present disclosure, the upper limit of the content of P may be limited to, in detail, 0.03%.

S: 0.02% or Less (Including 0%)

Sulfur (S) is an impurity element present in steel and binds to Mn, or the like, to form a nonmetallic inclusion, which leads to significant damage to toughness of the steel. Therefore, since the content of S is preferably reduced as much as possible, an upper limit of the content of S may be set to, in detail, 0.02%.

Nb: 0.005 to 0.03%

Niobium (Nb) is an element significantly useful in suppressing recrystallization during rolling to refine grains and serves to improve strength of steel. Therefore, at least 0.005% or more of Nb should be added. However, when the content of Nb is greater than 0.03%, a Nb carbonitride is precipitated to be harmful to the toughness of the steel. Therefore, the content of Nb may be controlled to be 0.005 to 0.03%.

Cr: 0.3 to 0.6%

Chromium (Cr) is an element improving hardenability and corrosion resistance. When the content of Cr is less than 0.3%, an effect of improving corrosion resistance due to addition of Cr is insufficient. Meanwhile, when the content of Cr is greater than 0.6%, the content is not preferable because weldability may be rapidly reduced. Therefore, the content of Cr may be controlled to be, in detail, 0.3 to 0.6%.

Ti: 0.005 to 0.03%

Titanium (Ti) is an element binding to nitrogen (N) in steel to form a TiN precipitate. In the present disclosure, certain austenite grains may be excessively coarsened during hot-rolling at a high temperature. Thus, the TiN may be appropriately precipitated to suppress growth of the austenite grains. To this end, at least 0.005% of Ti needs to be added. However, when the content of Ti is greater than 0.03%, the effect may be saturated and coarse TiN may be crystallized. Therefore, the content of Ti greater than 0.03% is not preferable. Therefore, in the present disclosure, the content of Ti may be limited to a range of, in detail, 0.005 to 0.03%.

Cu: 0.1 to 0.35%

Copper (Cu) is effective in improving hardenability and corrosion resistance of a base material or a welding zone. However, when the content of Cu is less than 0.1%, it is disadvantageous to secure corrosion resistance. Meanwhile, when the content of Cu is greater than 0.35%, manufacturing costs may be increased to result in economical disadvantage. Therefore, the content of Cu may be limited to a range of, in detail, 0.1 to 0.35%.

Ni: 0.05 to 0.3%

Nickel (Ni) is effective in improving the hardenability and corrosion resistance. When Ni is added together with Cu, Ni may react with Cu to suppress formation of a Cu phase having a low melting point, and thus, may suppress occurrence of cracking during hot working. In addition, Ni is an element effective in improving toughness of a base material. To obtain the above-described effects, Ni needs to be added in an amount of 0.05% or more. However, since Ni is an expensive element, excessive addition of Ni in an amount greater than 3% is economically disadvantageous. The content of Ni may be limited to a range of, in detail, 0.05 to 0.3%.

Mo: 0.01 to 0.15%

Molybdenum (Mo) is significantly effective in increasing strength of a material, and may suppress formation of a pearlite structure to secure excellent impact toughness. To this end, Mo should be added in an amount of 0.01% or more. However, since Mo is an expensive element, the content of Mo may be limited to 0.15% or less to suppress welding low-temperature cracking and to prevent toughness from being lowered by formation of a low-temperature transformation phase in the base material.

N: 0.007% or Less

Since nitrogen (N) causes aging deterioration in a solid-solubilized state, N is fixed as a nitride such as Ti, Al, or the like. When the content of N is greater than 0.007%, the amount of Ti, Al, or the like, may be unavoidably increased. Therefore, the amount of N may be limited to, in detail, 0.007% or less.

Ca: 0.001 to 0.006%

Calcium (Ca) is added to control morphology of sulfide. When the content of Ca is greater than 0.006%, CaS of a CaO cluster may be generated with respect to the amount of S in the steel. Meanwhile, when the amount of Ca is less than 0.001%, MnS may be formed and toughness may be reduced. In addition, when the amount of S is large, the amount of S may be preferably controlled at the same time to prevent generation of a CaS cluster. Therefore, the content of Ca may be limited to a range of, in detail, 0.001 to 0.006%.

Al: 0.01 to 0.05%

Aluminum (Al) is added for deoxidation during steelmaking. When the content of Al is less than 0.01%, such an action is insufficient. Meanwhile, when the content of Al is greater than 0.05%, formation of a composite oxide, including alumina or an alumina oxide may be promoted in a welding zone during electrical resistance welding and toughness of the welding zone may be deteriorated. Therefore, the content of Al may be limited to a range of, in detail, 0.01 to 0.05%.

The elements Mo and P should satisfy Relational Expression 1.

$$1.6 \leq (Mo/96)/(P/31) \leq 6 \quad \text{Relationship 1:}$$

Relational Expression 1 is given to prevent grain boundary segregation of P. When a value of Relational Expression 1 is less than 1.6, a P grain boundary segregation effect resulting from formation of a Fe—Mo—P compound is insufficient. When the value of Relational Expression 1 is greater than 6, impact energy is reduced because a low-temperature transformation phase is formed due to an increase in hardenability.

The elements Ca and S should satisfy Relational Expression 2.

$$1.6 \leq (Ca/S) \leq 3 \quad \text{Relationship 2:}$$

Relational Expression 2 is given to suppress formation of a nonmetallic inclusion acting as a crack formation and propagation path during an impact test and expansion of a steel pipe. When a value of Relation Expression 2 is less than 1.6, MnS is easily formed and elongated during rolling to act as a crack propagation path. When the value of Relational Expression 2 is greater than 3, Ca-based nonmetallic inclusion may be increased. Thus, separation may occur on a fracture surface of an impact specimen during an impact test of a steel material and a steel pipe to reduce impact energy. In certain cases, the value of Relational Expression 2 may be 1.7 or more.

The elements C and Mn should satisfy Relation Expression 3.

$$3.5 \leq (3*C/12 + Mn/55)*100 \leq 5 \quad \text{Relation Expression 3:}$$

Relation Expression 3 is given to suppress the formation of the light phase 2, bainite and MA (martensite and/or austenite) phases. Due to an increase in C and Mn, a solidification temperature of a slab may be reduced to promote segregation in a center of the slab and a section of delta ferrite may be narrowed to make it difficult to homogenize the slab during continuous casting. In addition, Mn is a representative element segregated in the center portion of the slab and promotes formation of a second phase, deteriorating ductility of a pipe, and due to an increase in C, a coexistence section of a solid phase and a liquid phase is widened during the continuous casting to result in severe segregation. Therefore, when a value of Relational Expression 3 is greater than 5, strength may be increased but inhomogeneity of the slab may be increased due to the above reason. Thus, a second phase, a hard phase, is formed in the slab to deteriorate low-temperature toughness of a steel material and a pipe. For this reason, the value of Relational Expression 3 may be, in detail, 5 or less to secure impact toughness of the steel material. However, when the value of Relational Expression 3 is less than 3.5, the strength may be decreased.

A high-strength high-toughness hot-rolled steel sheet according to an aspect of the present disclosure includes, by area fraction, 85% or more of polygonal ferrite and 15% or less of pearlite and includes a microstructure in which a crystal grain size of the polygonal ferrite is 10 μm or less.

When the fraction of the pearlite is greater than 15%, an initiation point of occurrence of cracking and separation is formed during an impact test to reduce impact energy. Therefore, the fraction of the pearlite may be limited to, in detail, 15% or less.

When a grain size of the polygonal ferrite is greater than 10 μm, resistance to crack propagation may be decreased to deteriorate impact characteristics and to reduce the strength. Therefore, the grain size of the polygonal ferrite may be limited to, in detail, 10 μm or less.

When the fraction of the polygonal ferrite is less than 85%, a fraction of a soft phase is decreased, so that strength may be improved but impact characteristics may be insufficient. Therefore, the fraction of the polygonal ferrite may be limited to, in detail, 85% or more.

In the hot-rolled steel sheet, the number of precipitates of 20 nm or less per $mm^2$ may be $7 \times 10^8$ or more.

In a high-strength high-toughness hot-rolled steel sheet according to an aspect of the present disclosure, a deviation in yield strength in a width direction is 35 MPa or less.

In the hot-rolled steel sheet, an impact toughness value measured through a Charpy impact test at temperature of −60° C. may be 95 J or more.

In the hot-rolled steel sheet, separation on the fracture surface of the impact specimen may be 0.01/mm or less.

The hot-rolled steel sheet may have a yield strength at room temperature of 520 MPa or more and a tensile strength at room temperature of 640 MPa or more.

Hereinafter, a method for manufacturing a high-strength high-toughness hot-rolled steel sheet according to another aspect of the present disclosure will be described.

A method for manufacturing a high-strength high-toughness hot-rolled steel sheet according to another aspect of the present disclosure includes: preparing a steel slab comprising, by weight percentage (wt %), 0.07 to 0.13% of carbon (C), 0.20 to 0.50% of silicon (Si), 0.5 to 0.9% of manganese (Mn), 0.03% or less of phosphorus (P), 0.02% or less of sulfur (S), 0.005 to 0.03% of niobium (Nb), 0.3 to 0.6% of chromium (Cr), 0.005 to 0.03% of titanium (Ti), 0.1 to 0.35% of copper (Cu), 0.05 to 0.3% of nickel (Ni), 0.01 to 0.15% of molybdenum (Mo), 0.007% or less of nitrogen (N), 0.001 to 0.006% of calcium (Ca), 0.01 to 0.05% of aluminum (Al), and a balance of iron (Fe) and other unavoidable impurities, the alloy elements satisfying Relational Expressions 1 to 3; heating the steel slab to a temperature within a range of 1100 to 1300° C. and maintaining the heated steel slab at temperature of 1160° C. or higher for 30 minutes or more, and then extracting; primarily hot rolling the heated and extracted steel slab under conditions of a finish rolling temperature of 900 to 1000° C. and a reduction ratio of 10% or more per pass in a recrystallization region and secondarily hot rolling the primarily hot-rolled steel slab under conditions of a finish rolling temperature of 750 to 870° C. and a cumulative reduction ratio of 85% or more in a non-recrystallization region to obtain a hot-rolled steel sheet; and water cooling the hot-rolled steel sheet to a cooling end temperature within a range of 500 to 580° C. at a cooling rate of 10 to 50° C. and then coiling, $1.6 \leq (Mo/96)/(P/31) \leq 6$,     Relational Expression 1:

$1.6 \leq (Ca/S) \leq 3$, and     Relational Expression 2:

$3.5 \leq (3*C/12+Mn/55)*100 \leq 5$     Relational Expression 3:

wherein heat energy is applied to both edge portions of the steel sheet to reduce a difference in cooling rates between a center portion and an edge portion of a steel material.

Heating Slab and Extracting

A steel slab having the above-described composition is heated to a temperature within a range of 1100 to 1300° C., maintained at temperature of 1160° C. or more for 30 minutes or more, and then extracted.

Since the heating process of the steel slab is a process in which steel is heated to smoothly perform a subsequent rolling process and to sufficiently obtain desired mechanical properties of a steel sheet, the heating process should be performed within an appropriate temperature range according to purpose.

In the operation of heating the steel slab, the steel slab should be uniformly heated to sufficiently solid-solubilize precipitated elements in the steel sheet, and coarse grains caused by a significantly high heating temperature should be prevented. The reheating temperature of the steel slab may be, in detail, 1100 to 1300° C., which is set for a casting structure and segregation formed in a slab manufacturing process and solid solution and homogenization of second phases. When the reheating temperature of the steel slab is less than 1100° C., homogenization may be insufficient or a heating furnace temperature is significantly low, causing deformation resistance to be increased during hot rolling. When the reheating temperature of the steel slab is higher than 1300° C., surface quality may be deteriorated.

Therefore, the heating temperature of the steel slab may have a range of, in detail, 1100 to 1300° C. In addition, when the steel slab is maintained at temperature of 1160° C. or higher for less than 30 minutes, the degree of cracking in thickness and length directions of the steel slab is low, which may result in poor rollability and a deviation of mechanical properties of a finally obtained steel sheet.

Obtaining Hot-Rolled Steel Sheet

The heated and extracted steel slab is primarily hot rolled under conditions of a finish rolling temperature of 900 to 1000° C. and a reduction ratio of 10% or more per pass in a recrystallization region, and is then secondarily hot rolled under conditions of a finish rolling temperature of 750 to 870° C. and a cumulative reduction ratio of 85% or more in a non-recrystallization region to obtain a hot-rolled steel sheet.

For example, it is important to finish primary rolling of the heated and extract steel slab at temperature within a range of 900 to 1000° C., to roll the steel slab at a reduction ratio of 10% or more per pass in the recrystallization region, and to secondarily roll the primarily rolled steel slab at a cumulative reduction ratio of 85% or more in a non-recrystallization region and finish the secondary rolling at temperature within a range of at 750 to 870° C. Hot rolling should be performed in the above-mentioned temperature range to effectively refine grains. In particular, when the finish rolling temperature is significantly high, a final structure may be coarsened to prevent desired strength from being obtained. Meanwhile, when the finish rolling temperature is significantly low, a load on a finishing rolling mill facility may be problematic. In addition, when the reduction per pass is less than 10% or when a rolling rate in the non-recrystallization region is less than 85%, impact toughness may be decreased.

In addition, it is important that a deviation in thickness at an edge portion of the steel sheet and a point of 100 mm from the edge portion is adjusted to be 90 mm or less.

When a thickness of the edge portion of the steel sheet is significantly reduced, a deviation of mechanical property may occur due to a structure deviation caused by supercooling during water cooling.

Cooling Hot-Rolled Steel Sheet and Coiling

The hot-rolled steel sheet is water cooled to a cooling end temperature of 500 to 580° C. at a cooling rate of 10 to 50° C./sec and is then coiled. During the water cooling, heat energy is applied to both edge portions of the steel sheet to reduce a difference in cooling rates between a center portion and the edge portion of the steel sheet.

When the cooling end temperature is higher than 580° C., surface quality is deteriorated and coarse carbide is formed to deteriorate toughness and strength. When the cooling end temperature is lower than 500° C., a large amount of cooling water is required during coiling and a load is significantly increased during the coiling. Therefore, the cooling end temperature may be limited to a range of, in detail, 500 to 580° C.

The applying heat energy to both edge portions of the steel sheet may be performed such that a deviation in temperature in a width direction of the steel sheet during water cooling is 150° C. or less.

For example, heat energy may be applied to both edge portions of the steel sheet such that a deviation in internal temperature at the edge portion of the steel sheet and a point of 100 mm from the edge portion is 150° C. by heating the edge portion of the steel sheet using an edge heater during water cooling.

The applying heat energy to both edge portions of the steel sheet may be performed using an edge heater and an edge mask.

When heat energy is not applied to both edge portions of the steel sheet using an edge heater, or the like, during water cooling, a temperature of both edge portions is decreased to be lower than a temperature of a center portion. Thus, a deviation in strength in a width direction of the steel sheet may be increased to cause a deviation in strength a circumferential direction of a steel pipe after production of the steel pipe.

In a high-strength high-toughness hot-rolled steel sheet manufactured by the method according to another aspect of the present disclosure, a microstructure includes, by area fraction, 85% or more of polygonal ferrite and 15% or less of pearlite and a grain size of the polygonal ferrite is 10 μm or less, and a deviation in yield strength in a width direction is 35 MPa or less.

In the hot-rolled steel sheet, the number of precipitates of 20 nm or less per mm$^2$ may be 7×10$^8$ or more.

In the hot-rolled steel sheet, an impact toughness value measured through a Charpy impact test at temperature of −60° C. may be 95 J or more, separation on the fracture surface of the impact specimen may be 0.01/mm or less, and a yield strength at room temperature may be 520 MPa or more and a tensile strength at room temperature may be 640 MPa or more.

BEST MODE FOR INVENTION

Hereinafter, the present disclosure will be described more specifically through examples.

Steel having chemical components shown in Tables 1 and 2 was prepared a slab by continuous casting, and the slab was then rolled under hot-rolling conditions shown in Table 3 to manufacture a hot-rolled steel sheet having a thickness of 4 mm.

In the hot-rolled steel sheet, the number of precipitates of 20 nm or less (number/mm$^2$), fractions of ferrite and pearlite, a fraction of MA (%), a separation length (mm), and a ferrite grain size (μm) were measured, and results thereof are listed in Table 4.

In addition, in the hot-rolled steel sheet, yield strength YS, tensile strength TS, a device of mechanical property of the yield strength, and impact energy full size conversion (@−60° C.) were measured, and results thereof are listed in Table 5. In Table 5, strength was measured according to a commonly used ASTM A370, and the impact energy was measured by performing a Charpy impact test at temperature of −60° C.

TABLE 1

| Remark | Steel Type | C | Si | Mn | P | S | Nb | Cr | Ti | Cu | Ni | Mo | N | Ca | Al |
|---|---|---|---|---|---|---|---|---|---|---|---|---|---|---|---|
| Inventive Steel | A1 | 0.12 | 0.35 | 0.55 | 0.008 | 0.001 | 0.02 | 0.55 | 0.015 | 0.27 | 0.15 | 0.08 | 0.005 | 0.0021 | 0.032 |
| | A2 | 0.08 | 0.33 | 0.90 | 0.0089 | 0.0013 | 0.03 | 0.54 | 0.02 | 0.272 | 0.14 | 0.08 | 0.004 | 0.0025 | 0.038 |
| | A3 | 0.10 | 0.35 | 0.89 | 0.0067 | 0.0017 | 0.02 | 0.52 | 0.018 | 0.279 | 0.142 | 0.08 | 0.003 | 0.0028 | 0.034 |
| | A4 | 0.11 | 0.34 | 0.85 | 0.0124 | 0.0013 | 0.022 | 0.52 | 0.019 | 0.262 | 0.148 | 0.08 | 0.004 | 0.0025 | 0.034 |
| | A5 | 0.12 | 0.35 | 0.70 | 0.0107 | 0.0015 | 0.021 | 0.54 | 0.011 | 0.274 | 0.141 | 0.08 | 0.005 | 0.0029 | 0.035 |
| Comparative Steel | B1 | <u>0.14</u> | 0.32 | <u>1.1</u> | 0.015 | 0.0019 | 0.02 | 0.55 | 0.012 | 0.3 | 0.23 | 0.01 | 0.004 | 0.015 | 0.035 |
| | B2 | <u>0.15</u> | 0.32 | <u>1.2</u> | 0.012 | 0.002 | 0.02 | 0.59 | 0.013 | 0.28 | 0.17 | 0.03 | 0.006 | 0.002 | 0.035 |
| | B3 | 0.09 | 0.32 | 0.28 | 0.011 | 0.0021 | 0.01 | 0.52 | 0.014 | 0.29 | 0.24 | 0.02 | 0.007 | 0.0014 | 0.035 |
| | B4 | 0.11 | 0.35 | 0.52 | 0.011 | 0.0015 | 0.011 | 0.6 | 0.014 | 0.3 | 0.17 | 0.04 | 0.004 | 0.0018 | 0.035 |
| | B5 | 0.12 | 0.35 | 0.9 | 0.011 | 0.002 | 0.02 | 0.6 | 0.014 | 0.3 | 0.17 | 0.03 | 0.004 | 0.002 | 0.035 |

TABLE 2

| Remark | Steel Type | (Mo/93)/(P/31) | Ca/S | (3 * C/12 + Mn/55) * 100 |
|---|---|---|---|---|
| Inventive Steel | A1 | 3.3 | 2.1 | 4.5 |
| | A2 | 3.0 | 1.9 | 3.6 |
| | A3 | 4.0 | 1.6 | 4.1 |
| | A4 | 2.0 | 1.9 | 4.3 |
| | A5 | 2.5 | 1.9 | 4.2 |
| Comparative Steel | B1 | 0.2 | 0.8 | 5.5 |
| | B2 | 0.8 | 1.0 | 5.9 |
| | B3 | 0.6 | 0.7 | 3.9 |
| | B4 | 1.2 | 1.2 | 4.2 |
| | B5 | 0.9 | 1.0 | 4.6 |

TABLE 3

| Remark | Steel Type | Reheating Temperature (° C.) | Furnace Maintaining Time at 1160° C. or higher (min) | Average Reduction Ratio of Recrystallization Region (%) | Reduction Ratio of Recrystallization Region (%) | Primary Rolling Temperature (° C.) | Secondary Rolling Temperature (° C.) | Cooling Rate (° C./sec) | Coiling Temperature (° C.) | Use of Edge Heater | Use of 150 mm Edge Mask |
|---|---|---|---|---|---|---|---|---|---|---|---|
| Inventive Steel | A1 | 1195 | 65 | 15 | 90 | 930 | 520 | 15 | 520 | Used | Used |
|  | A2 | 1187 | 66 | 15 | 85 | 955 | 835 | 20 | 530 | Used | Used |
|  | A3 | 1187 | 61 | 20 | 92 | 945 | 555 | 22 | 545 | Used | Used |
|  | A4 | 1195 | 60 | 25 | 92 | 935 | 523 | 31 | 529 | Used | Used |
|  | A5 | 1193 | 66 | 15 | 90 | 923 | 831 | 26 | 546 | Used | Used |
| Comparative Steel | B1 | 1277 | 78 | 15 | 92 | 944 | 828 | 18 | 550 | Used | Used |
|  | B2 | 1105 | 62 | 15 | 91 | 968 | 519 | 22 | 564 | Used | Used |
|  | B3 | 1310 | 63 | 13 | 87 | 932 | 822 | 24 | 576 | Not Used | Not Used |
|  | B4 | 1186 | 68 | 20 | 88 | 923 | 861 | 25 | 590 | Not Used | Not Used |
|  | B5 | 1192 | 71 | 15 | 92 | 943 | 562 | 15 | 561 | Not Used | Not Used |
|  | A1 | 1080 | 58 | 15 | 91 | 948 | 833 | 20 | 620 | Not Used | Not Used |
|  | A2 | 1124 | 53 | 15 | 88 | 937 | 867 | 18 | 630 | Not Used | Not Used |

TABLE 4

| Remark | Steel Type | Thickness Deviation in Width Direction (mm) | Temperature Deviation in Width Direction (° C.) | Number of Precipitates of 20 nm or less (number/mm$^2$) | Ferrite Fraction (%) | Pearlite Fraction (%) | MA Fraction (%) | Separation Length (mm) | Ferrite Grain Size (μm) |
|---|---|---|---|---|---|---|---|---|---|
| Inventive Steel | A1 | 32 | 80 | 7.2 × 10$^8$ | 89 | 11 | 0 | 0.005 | 7 |
|  | A2 | 45 | 95 | 7.5 × 10$^8$ | 88 | 12 | 0 | 0 | 8 |
|  | A3 | 89 | 120 | 8.7 × 10$^8$ | 90 | 10 | 0 | 0 | 9 |
|  | A4 | 30 | 111 | 7.9 × 10$^8$ | 92 | 8 | 0 | 0.006 | 8 |
|  | A5 | 65 | 123 | 8.1 × 10$^8$ | 88 | 12 | 0 | 0 | 9 |
| Comparative Steel | B1 | 101 | 190 | 5.3 × 10$^8$ | 78 | 21 | 1 | 0.15 | 11 |
|  | B2 | 102 | 220 | 6.8 × 10$^8$ | 77 | 21.8 | 1.2 | 0.25 | 12 |
|  | B3 | 112 | 245 | 6.3 × 10$^8$ | 88 | 12 | 0 | 0.1 | 14 |
|  | B4 | 123 | 310 | 5.8 × 10$^8$ | 87 | 13 | 0 | 0.05 | 16 |
|  | B5 | 123 | 285 | 6.1 × 10$^8$ | 82 | 18 | 0 | 0.13 | 12 |
|  | A1 | 142 | 387 | 6.2 × 10$^8$ | 76 | 24 | 0 | 0.08 | 18 |
|  | A2 | 121 | 293 | 5.8 × 10$^8$ | 75 | 25 | 0 | 0.09 | 19 |

TABLE 5

| Remark | Steel Type | YS (MPa) | TS (MPa) | Deviation of Mechanical Property of YS (MPa) | Impact Energy Full Size Conversion (8-60° C.) |
|---|---|---|---|---|---|
| Inventive Steel | A1 | 548 | 676 | 25 | 100 |
|  | A2 | 552 | 677 | 22 | 108 |
|  | A3 | 552 | 681 | 16 | 116 |
|  | A4 | 556 | 682 | 27 | 120 |
|  | A5 | 531 | 667 | 30 | 124 |
| Comparative Steel | B1 | 589 | 691 | 26 | 52 |
|  | B2 | 601 | 712 | 22 | 40 |
|  | B3 | 562 | 691 | 64 | 84 |
|  | B4 | 515 | 628 | 62 | 88 |
|  | B5 | 540 | 647 | 26 | 92 |
|  | A1 | 490 | 613 | 78 | 48 |
|  | A2 | 485 | 609 | 72 | 44 |

As shown in Tables 1 to 5, in the case of inventive steels prepared according to components and component ranges, component relational expression, and manufacturing conditions conforming to the present disclosure, polygonal ferrite and pearlite having appropriate fractions were formed to have yield strength of 520 MPa or more and tensile strength 640 MPa or more. In addition, as a result of preventing supercooling of both edge portions using an edge heater, a deviation in yield strength in a width direction could be suppressed to 35 MPa or less and it can be seen that impact energy of 95 J or more was secured at temperature of −60° C.

The invention claimed is:

1. A high-strength high-toughness hot-rolled steel sheet comprising, by weight percentage (wt %): 0.07 to 0.13% of carbon (C), 0.20 to 0.50% of silicon (Si), 0.5 to 0.9% of manganese (Mn), 0.03% or less of phosphorus (P), 0.02% or less of sulfur (S), 0.005 to 0.03% of niobium (Nb), 0.3 to 0.6% of chromium (Cr), 0.005 to 0.03% of titanium (Ti), 0.1 to 0.35% of copper (Cu), 0.05 to 0.3% of nickel (Ni), 0.01 to 0.15% of molybdenum (Mo), 0.007% or less of nitrogen (N), 0.001 to 0.006% of calcium (Ca), 0.01 to 0.05% of aluminum (Al), and a balance of iron (Fe) and other unavoidable impurities, the alloy elements satisfying Relational Expressions 1 to 3, $$1.6 \leq (Mo/96)/(P/31) \leq 6,$$ Relational Expression 1:

$$1.6 \leq (Ca/S) \leq 3, \text{ and}$$ Relational Expression 2:

$$3.5 \leq (3*C/12 + Mn/55)*100 \leq 5,$$ Relational Expression 3:

wherein a microstructure consists of, by area fraction, 85% or more of polygonal ferrite and 15% or less of pearlite and a grain size of the polygonal ferrite is 10 μm or less (excluding 0%), wherein a deviation in yield strength in a width direction is 35 MPa or less, wherein the hot-rolled steel sheet has precipitates in which the number of precipitates of 20 nm or less per mm$^2$ is 7×10$^8$ or more, wherein the hot-rolled steel sheet has an impact toughness value measured through a Charpy impact test at temperature of −60° C. of 95 J or more, and separation length on a fracture surface of the impact specimen of 0.01/mm or less, and wherein the hot-rolled steel sheet has a yield strength at room temperature of 520 MPa or more, and a tensile strength at room temperature of 640 MPa or more, wherein yield strength and tensile strength were measured according to ASTM A370.

* * * * *